US009206589B2

(12) United States Patent
Price

(10) Patent No.: US 9,206,589 B2
(45) Date of Patent: Dec. 8, 2015

(54) SYSTEM AND METHOD FOR CONTROLLING MACHINES REMOTELY

(75) Inventor: Robert J. Price, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 739 days.

(21) Appl. No.: 12/750,698

(22) Filed: Mar. 30, 2010

(65) Prior Publication Data

US 2010/0249957 A1 Sep. 30, 2010

Related U.S. Application Data

(60) Provisional application No. 61/165,464, filed on Mar. 31, 2009.

(51) Int. Cl.
*G06F 3/048* (2013.01)
*G05B 15/02* (2006.01)
*E02F 9/20* (2006.01)
*G08C 17/02* (2006.01)

(52) U.S. Cl.
CPC ................ *E02F 9/205* (2013.01); *G08C 17/02* (2013.01)

(58) Field of Classification Search
CPC ................................ E02F 9/205; G08C 17/02
USPC ................ 700/15, 17, 83, 85, 275; 701/2, 50; 340/679, 686.1; 37/348; 715/772
See application file for complete search history.

(56) References Cited

U.S. PATENT DOCUMENTS 4,776,750 A 10/1988 Griswold, Jr. et al.
4,855,822 A 8/1989 Narendra et al.
4,887,223 A 12/1989 Christian
4,952,152 A * 8/1990 Briggs et al. .................... 434/69
5,046,022 A * 9/1991 Conway et al. ............... 700/250
5,404,661 A * 4/1995 Sahm et al. ...................... 37/348
5,483,440 A 1/1996 Aono et al.
5,850,341 A 12/1998 Fournier et al.
5,852,646 A * 12/1998 Klotz et al. ........................ 378/8
5,919,242 A * 7/1999 Greatline et al. ............... 701/50
5,974,348 A 10/1999 Rocks
6,114,993 A * 9/2000 Henderson et al. ............. 37/348
6,266,595 B1 * 7/2001 Greatline et al. ............... 701/50
6,476,730 B2 * 11/2002 Kakinami et al. ......... 340/932.2
6,484,083 B1 11/2002 Hayward et al.
6,611,744 B1 * 8/2003 Shimazaki et al. ............. 701/41
6,701,226 B2 * 3/2004 Yamada et al. ................... 701/1
6,704,653 B2 * 3/2004 Kuriya et al. ................. 701/301
6,711,473 B2 * 3/2004 Shimazaki et al. ............... 701/1
6,739,078 B2 5/2004 Morley et al.
6,778,097 B1 * 8/2004 Kajita et al. .................. 340/679
6,782,644 B2 8/2004 Fujishima et al.
6,819,993 B2 11/2004 Koch
6,825,880 B2 * 11/2004 Asahi et al. .............. 348/333.02
7,012,548 B2 * 3/2006 Ishii et al. .................. 340/932.2
7,181,315 B2 2/2007 Watanabe et al.
7,318,292 B2 1/2008 Helbling et al.

(Continued)

*Primary Examiner* — Charles Kasenge
(74) *Attorney, Agent, or Firm* — Finnegan, Henderson, Farabow, Garrett & Dunner, LLP

(57) ABSTRACT

Systems and methods for remotely controlling machines includes generating, on a display device associated with a remote control console, a first image associated with a position of the machine at a first time period. A virtual position of the machine is estimated based at least on the first position and at least one operating parameter associated with the machine. A virtual image of the machine relative to the first image is generated on the display device, the virtual image of the machine corresponding to the estimated virtual position of the machine.

20 Claims, 5 Drawing Sheets

(56) References Cited

U.S. PATENT DOCUMENTS

| | | | | |
|---|---|---|---|---|
| 7,330,777 | B2 | 2/2008 | Hashimoto et al. | |
| 7,366,595 | B1 * | 4/2008 | Shimizu et al. | 701/301 |
| 7,513,070 | B2 * | 4/2009 | Ogura et al. | 37/348 |
| 7,627,419 | B2 * | 12/2009 | Yoshida | 701/117 |
| 7,672,822 | B2 * | 3/2010 | Lee et al. | 703/7 |
| 7,684,593 | B2 * | 3/2010 | Chinomi | 382/104 |
| 7,755,511 | B2 * | 7/2010 | Yamamoto et al. | 340/932.2 |
| 8,139,108 | B2 * | 3/2012 | Stratton et al. | 701/2 |
| 8,144,245 | B2 * | 3/2012 | Vik | 348/424.1 |
| 2001/0017591 | A1 * | 8/2001 | Kuriya et al. | 340/932.2 |
| 2002/0005779 | A1 * | 1/2002 | Ishii et al. | 340/436 |
| 2002/0089499 | A1 * | 7/2002 | Lee et al. | 345/419 |
| 2003/0147727 | A1 * | 8/2003 | Fujishima et al. | 414/200 |
| 2004/0204807 | A1 * | 10/2004 | Kimura et al. | 701/36 |
| 2005/0212797 | A1 * | 9/2005 | Lee et al. | 345/419 |
| 2006/0026101 | A1 * | 2/2006 | Ogura et al. | 705/50 |
| 2006/0034535 | A1 * | 2/2006 | Koch et al. | 382/254 |
| 2008/0047170 | A1 * | 2/2008 | Nichols | 37/348 |
| 2008/0180523 | A1 * | 7/2008 | Stratton et al. | 348/114 |
| 2008/0208415 | A1 * | 8/2008 | Vik | 701/50 |
| 2009/0015675 | A1 * | 1/2009 | Yang | 348/148 |
| 2009/0177337 | A1 * | 7/2009 | Yuet et al. | 701/2 |
| 2009/0309970 | A1 * | 12/2009 | Ishii et al. | 348/143 |

* cited by examiner

SYSTEM AND METHOD FOR CONTROLLING MACHINES REMOTELY

This application claims priority to and the benefit of the filing date of U.S. Provisional Patent Application No. 61/165,464, filed Mar. 31, 2009, which is herein incorporated by reference in its entirety.

TECHNICAL FIELD

The present disclosure relates generally to controlling machines and, more particularly, to a system and method for controlling machines remotely.

BACKGROUND

Mining and excavating operations may require fleets of machines to transport excavated material (e.g., dirt, rocks, gravel, etc.) from an area of excavation to a secondary location. In some cases, mining and excavating operations are performed in harsh environments and/or extremely remote locations, where the use of conventional machine systems that employ human operators is prohibitively expensive or otherwise impractical. In such environments, it may be advantageous to employ machines that may be operated, at least in part, by remote control (e.g., without necessarily requiring an on-board human operator).

In some applications, there may be a time delay between an operator input command at a remote control and the initiation and/or completion of the operator command by the machine. The time delay may be a function of the distance between the location of the operator and the location of the machine. In some remote control applications, an operator that is located a large distance away from a machine may rely on a visual display of the machine on a display device associated with the remote control console to control the machine. The time delay, however, may result in the actual movements of the machine being out of sync with what the operator observes the machine doing on the visual display. In other words, the machine's location or position may have changed since the last update of the machine's position has been uploaded to the display device of the remote control console. This may lead to difficulty in the ability to accurately control the machine remotely.

One system and method for controlling a machine remotely while taking into consideration the time delay of such remote control is disclosed in U.S. Pat. No. 4,855,822 (the '822 patent), issued to Narendra et al. The '822 patent discloses a remote driving system for controlling a vehicle from a remote control station. The '822 patent discloses performing a bandwidth reduction to compress video information recorded at the machine in order to allow for more efficient and rapid transport of the video data to the display device at the remote control console. The '822 patent discloses that such a bandwidth reduction allows the remote operator to receive the image and video data associated with the machine in real-time or near real-time.

Although the systems and methods disclosed in the '822 patent may facilitate remote control of the machine in certain situations, it may still be problematic, particularly in situations where, despite the bandwidth reduction techniques employed by the '822 patent, there is a lag between the time that the video is recorded at the machine and when the video is displayed at the operator console. For example, if a network connection or communication link is temporarily lost, the system of the '822 patent does not employ a technique for effectively accounting for machine operation during the time period associated with the delay from the lost connection. Such unaccounted-for delay in the video data renders the remote control operator unable to effectively control the machine, as the operator receives no video information during the "black out" period.

Moreover, the bandwidth reduction/video data compression technique associated with the system described in the '822 patent is disclosed as being designed to ensure that video information is received at the operator console in "real-time" or near "real-time." However, the system of the '822 patent does not provide a tool for estimating or predicting a future position of the machine. Should the "real-time" or near "real-time" video data become temporarily delayed or unavailable, the system is unable to provide the operator with an estimated position of the machine. As a result, the operator may not be able to effectively predict the machine's position, which may significantly impair the operator's ability to control the machine until updated "real-time" video data is provided to the remote control console.

The disclosed systems and methods for controlling machines remotely are directed toward overcoming one or more of the problems set forth above and/or the problems in the prior art.

SUMMARY

In one aspect, the present disclosure is directed to a method for controlling a machine remotely, the method comprising generating, on a display device associated with a remote control console, a first image associated with a position of the machine at a first time period. The method may also include estimating a second position of the machine based at least on the first position and at least one operating parameter associated with the machine. A virtual image of the machine relative to the first image may be generated on a display device, the virtual image of the machine corresponding to the estimated second position of the machine.

In another aspect, the present disclosure is directed to a method for controlling a machine remotely. The method may comprise receiving, at a first time period, information indicative of a coordinate location of the machine, an orientation of the machine, and at least one operating parameter associated with the machine. The method may also include generating, on a display device associated with a remote control console, a first image associated with a position of the machine within a worksite at a first time period, and estimating a second position of the machine based at least on the first position of the machine and the at least one operating parameter associated with the machine. A second position of the machine within the worksite may be predicted based on the coordinate location of the machine received at the first time period, an amount of time elapsed relative to the first time period, and the at least one operating parameter associated with the machine, and a virtual image of the machine relative to the first image may be generated on the display device, the virtual image of the machine based on the predicted second location of the machine.

In another aspect, the present disclosure is directed to a remote control console configured to control a machine remotely. The remote control console may comprise an operator interface configured to receive an input from an operator corresponding to a desired location of the machine, and a processor. The processor may be configured to generate, on a display device associated with a remote control console, a first image associated with a position of the machine at a first time period, and estimate a second position of the machine based at least on the first position and at least one operating parameter associated with the machine. A virtual image of the machine relative to the first image may be generated on the display device, the virtual image of the machine corresponding to the estimated second position of the machine.

DETAILED DESCRIPTION

Figure 1:
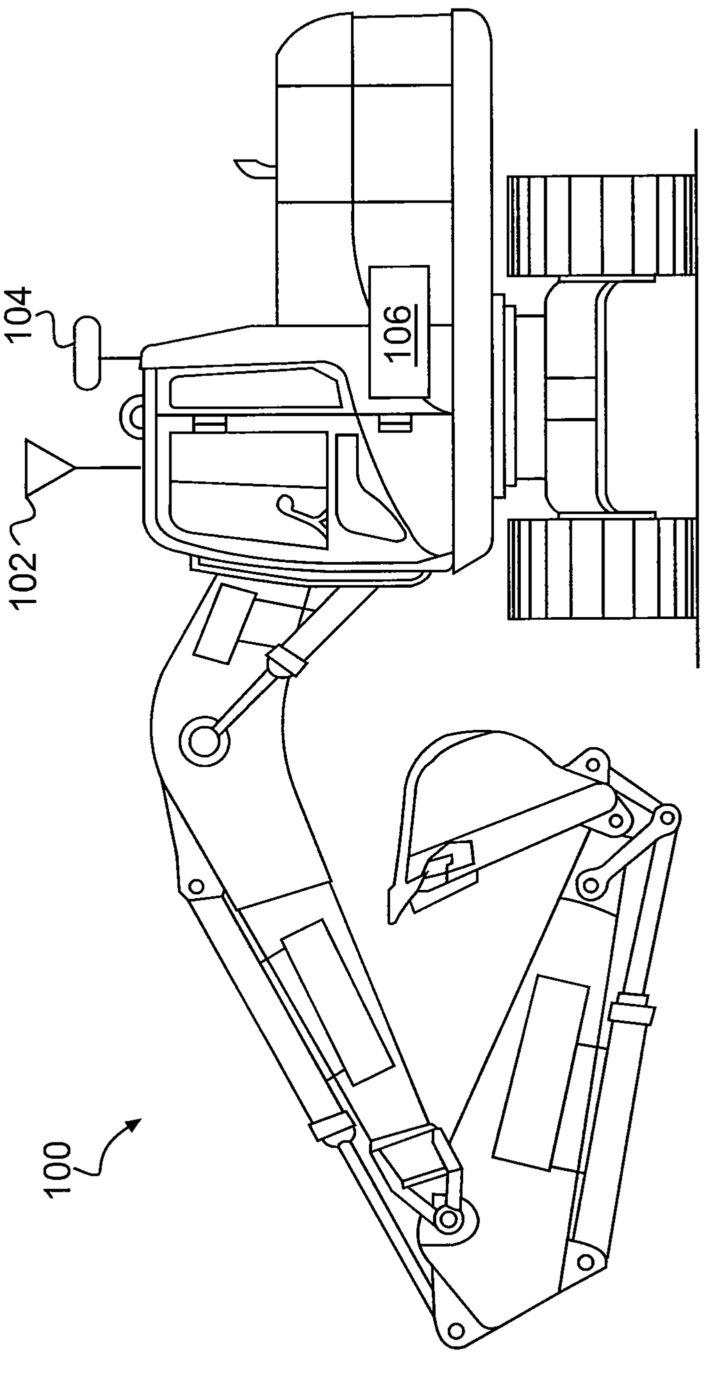
FIG. 1 is a diagrammatic illustration of an exemplary machine, consistent with the disclosed embodiments.

FIG. 1 illustrates an exemplary machine 100. As illustrated in FIG. 1, machine 100 may embody an excavator for removing overburden from a worksite. Although machine 100 is illustrated as an excavator, machine 100 may be any type of machine that performs some type of operation associated with an industry such as mining, construction, farming, transportation, etc. For example, machine 100 may be an earth-moving machine such as, for example, a loader, a backhoe, a tractor, a dozer, and the like.

In the embodiment of FIG. 1, machine 100 may comprise a wireless communication device 102, a machine positioning sensor or system 104 (such as a GPS-based positioning unit, a sonar or laser guidance system, a Glosnass-based positioning system, a Galileo-based positioning system, or any other type of positioning, navigation, and/or location-based system), and a controller 106. Wireless communication device 102 may comprise one or more wireless devices configured to exchange communication and control signals with a remote location that is used to control machine 100 remotely. Machine positioning system 104 may comprise one or more wireless devices configured to receive information (i.e., location coordinates) indicative of a position of machine 100 relative to orbital satellites, land-based positioning devices, positioning systems mounted on other machines, or any other reference device suitable for estimating the location of machine 100. It is contemplated that a machine positioning system 104 may be coupled to an implement of machine 100. In this way, the location of the implement of machine 100 may be determined by the location coordinates received by machine positioning system 104 relative to a reference device.

Controller 106 may comprise a system of one or more electronic control modules configured to receive control signals from a remote control site via wireless communication device 102, and then operate machine 100 as a function of the control signals. Controller 106 may include one or more computer mapping systems (not shown). The computer mapping system(s) may comprise tables, graphs, and/or equations for use when machine 100 is being controlled remotely. For example, the computer mapping system(s) may comprise the dimensions of machine 100 and topographical and geographical information of a worksite. It is contemplated that the tables, graphs, and/or equations in the computer mapping system(s) may be updated via wireless communication device 102, and/or any other suitable communication device. Controller 106 may further include one or more other components or subsystems such as, for example, power supply circuitry, signal conditioning circuitry, and/or any other suitable circuitry for aiding in the control of one or more systems of machine 100.

Based on worksite information contained in the computer mapping system(s), controller 106 may be able to estimate a current and future location, path, and/or route associated with machine 100 by calculating one or more parameters associated with the machine. For example, controller 106 may be configured to predict a machine location, path, and/or route by estimating changes in the position, velocity, acceleration, and/or angular position associated with machine 100. In some cases, controller 106 may use pressure or position readings associated with one or more components of machine 100 to determine weight and payload information associated with machine 100, in order to more accurately predict changes in position velocity, acceleration, and/or angular position.

Figure 2:
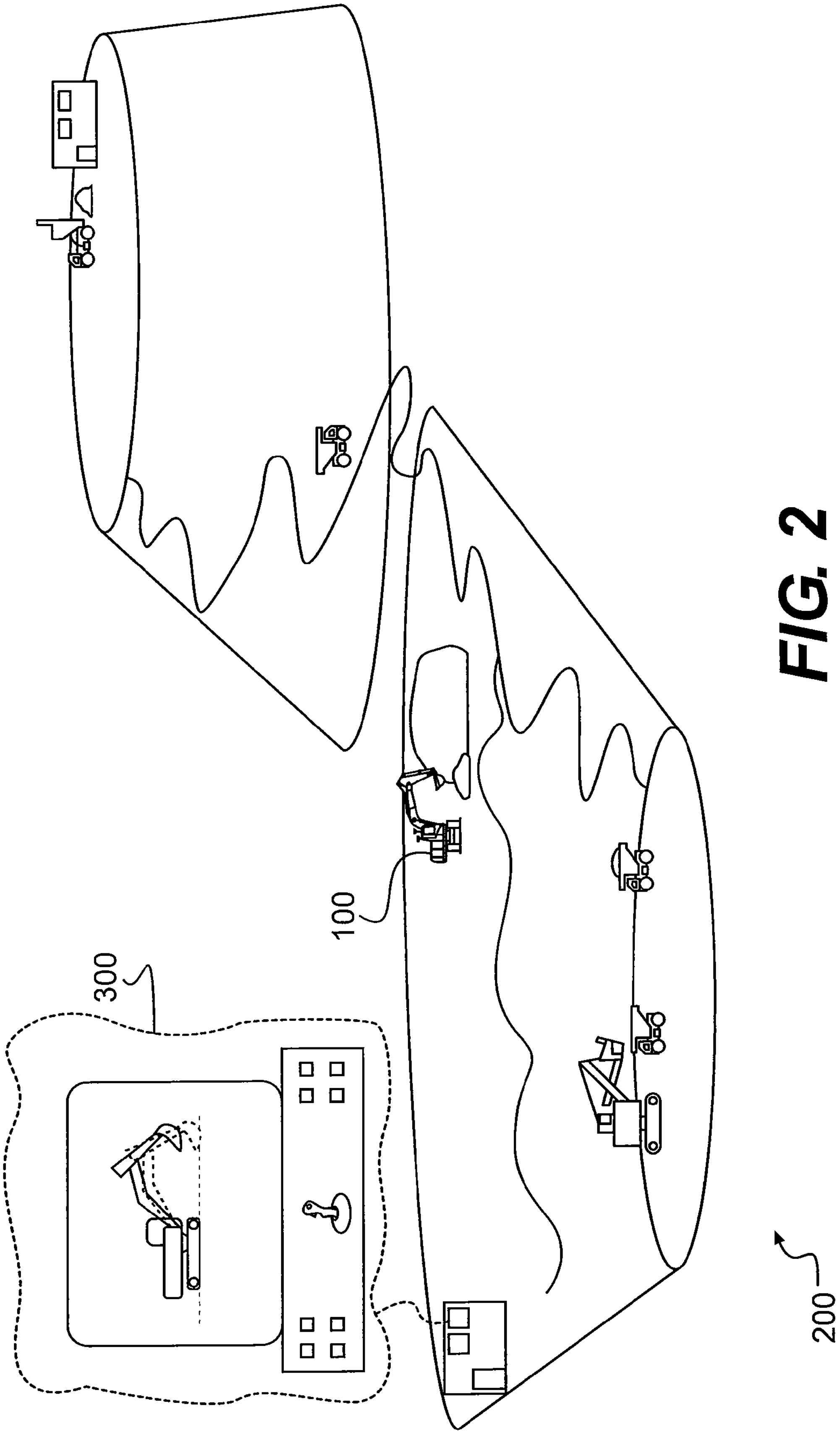
FIG. 2 is a diagrammatic illustration of an exemplary worksite.

FIG. 2 illustrates an exemplary worksite 200, in which exemplary systems and methods for controlling machine 100 remotely may be implemented. As illustrated in FIG. 2, worksite 200 may include a plurality of machines cooperating to perform a task associated with worksite 200. One of those machines, for example machine 100, may be remotely-controlled (i.e., controlled by a human operator located off-board of the machine).

When controlling a machine with a remote control (i.e., remotely), there may be a time delay between an operator input command at the remote control console and the initiation and/or completion of the operator input command by the machine. The time delay may be a function of the distance between the location of the operator and the location of the machine. In some embodiments, an operator that is located a far distance away from a machine may rely on a visual display of the machine movements when controlling the machine. The time delay, however, may result in the actual movements of the machine being out of phase with what the operator observes the machine doing on the visual display. Such a time delay may lead to difficulty in controlling the machine remotely.

Accordingly, worksite 200 may include a remote control console 300 configured to compensate for the time delay associated with controlling machine 100 remotely. The remote control console 300 may be configured to display to an operator a visual image of the actual location of machine 100, and a separate virtual image that models future movements of machine 100 as a function of the time delay and physical characteristics of machine 100. The physical characteristics of machine 100 may include, for example, the weight, size, and dimensions of machine 100. In this way, the operator may control the virtual image of machine 100 in real-time, with the movements of the virtual image being constrained by the physics of machine 100 and its control time-lag associated with controlling machine 100 remotely.

As illustrated in FIG. 2, worksite 200 is an exemplary above-ground mining environment where machine 100 may be controlled remotely. It is contemplated, however, that the embodiments described herein may be implemented in any type of work environment where it may be advantageous to allow for controlling a machine remotely while taking into consideration the time delay associated with such remote control. For example, in addition to the above-ground mining environments, such as the one illustrated in FIG. 2, it is contemplated that the systems and methods for remote machine control described herein may be applicable to surface work environments, subsurface work environments, and/or underground work environments.

Figure 3:
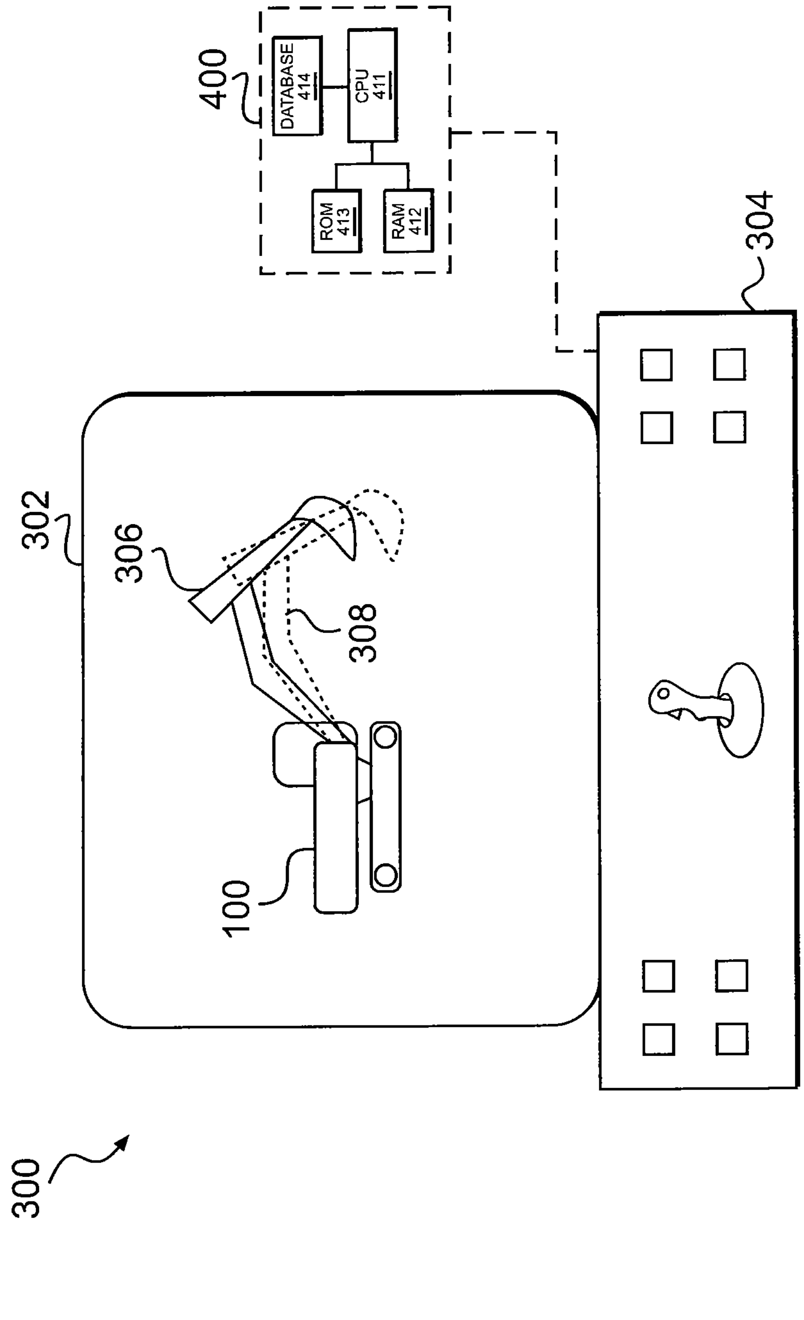
FIG. 3 is an exemplary disclosed control console for controlling the machine of FIG. 1 remotely.

FIG. 3 illustrates an exemplary remote control console 300 that may be associated with worksite 200. Remote control console 300 may include a display device 302, an operator interface 304, and a computing system 400 associated with operator interface 304.

Display device 302 may be any type of display device such as, for example, a cathode ray tube display device, a liquid crystal display device, a plasma display device, or any other type of display device. Display device 302 may be configured to display a visual image 306 (solid line) and a virtual image 308 (dashed line) of machine 100. The visual image 306 of machine 100 may correspond to the actual location of machine 100 or machine 100 components such as, for example, an implement of machine 100.

The actual location of machine 100 and machine 100 components, and therefore the location of virtual image 308 on display device 302, may be determined by location coordinates that are received by machine 100 from a plurality of Global Positioning Satellites via GPS antenna 104. Moreover, it is contemplated that the actual location of machine 100 components (e.g., an implement of machine 100) may be determined by flow rates and pressures associated with actuators that are used to control the machine components. For example, a position sensor associated with an actuator used to control an implement of machine 100 may forward information indicative of a current pressure or position of the actuator to controller 106. Controller 106 may compare the forwarded information with known pressures or positions in a memory of controller 106 that relate to a current location and/or orientation of the implement. In this way, the current location and/or orientation of the implement may be determined. In one embodiment, controller 106 may further forward the information received from the position sensor to computing system 400 for similar processing.

The virtual image 308 may correspond to a predicted location of machine 100 or machine 100 components such as, for example, an implement of machine 100. As illustrated in FIG. 3, the virtual image 308 of machine 100 has its implement out and in front of the actual location of the implement of machine 100. This may indicate that an operator has used operator interface 304 to reposition the implement of machine 100. The distance between the virtual image 308 of the implement of machine 100 on display device 302 and the visual image 306 of the implement of machine 100 on display device 302 may be determined by computing system 400 using, for example, the time delay associated with controlling machine 100 remotely, and the physical characteristics of machine 100.

Operator interface 304 may be configured to receive input from a machine operator indicative of a desired movement of machine 100. For example, operator interface 304 may be configured to position and/or orient machine 100 by producing and sending an interface device control signal to computing system 400. Computing system 400 may then forward the control signal to controller 106 of machine 100, whereby controller 106 positions and/or orients machine 100 in response to the control signal.

Operator interface 304 may comprise a plurality of operator interface devices. The plurality of operator interface devices may include, for example, a multi-axis joystick and a plurality of interface buttons. It is contemplated that additional and/or different operator interface devices may be associated with operator interface 304 such as, for example, wheels, knobs, push-pull devices, switches, pedals, and other operator interface devices known in the art.

Figure 4:
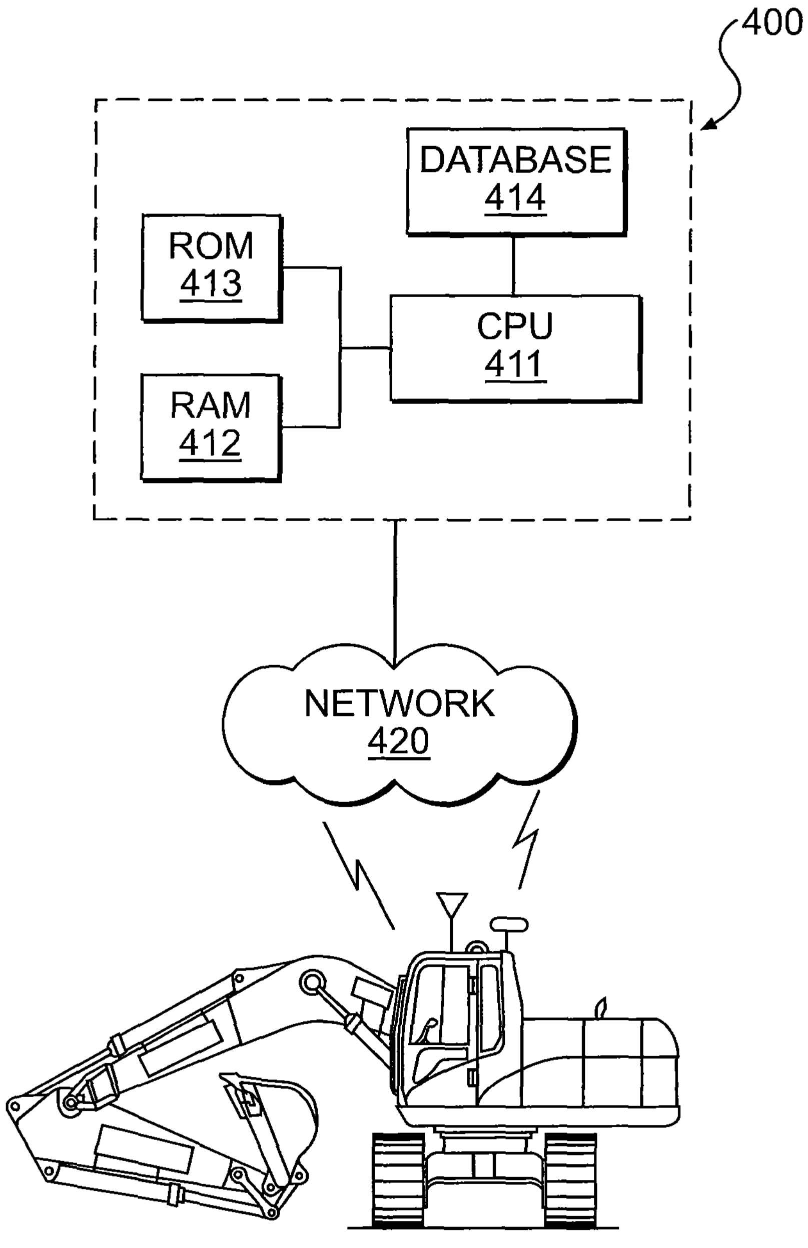
FIG. 4 is an exemplary disclosed computing system associated with the control console of FIG. 3.

FIG. 4 illustrates an exemplary computing system 400 which may be associated with remote control console 300. Computing system 400 may be configured to receive control signals from operator interface 304, process the control signals, and then forward the control signals to controller 106 of machine 100. In this way, controller 106 may position and/or orient machine 100 as a function of the control signals. Computing system 400 may further be configured to receive communications signals from controller 106 of machine 100, process the communication signals, and, for example, use information indicative of the communication signals (e.g., location coordinates of machine 100 and/or pressures or positions associated with actuators used to control machine 100 components) to display the visual image 306 and the virtual image 308 of machine 100 on display device 302. Computing system 400 may include one or more hardware and/or software components such as, for example, a Central Processing Unit (CPU) 411, a random access memory (RAM) module 412, a read-only memory (ROM) module 413, and a database 414. Additionally, computing system 400 may include one or more software components or applications to perform specific processing and analysis functions associated with the disclosed embodiments. Computing system 400 may include, for example, a mainframe, a server, a desktop, a laptop, and the like.

CPU 411 may include one or more processors, each configured to execute instructions and process data to perform functions associated with controlling machine 100 remotely. Database 414 may include one or more analysis tools for analyzing information within database 414. Database 414 may be configured as a relational database, distributed database, or any other suitable database format. Database 414 may include one or more software and/or hardware components that store, sort, filter, and/or arrange current and/or previously known dimensions of machine 100. Database 414 may store additional and/or different information than that listed above.

Computing system 400 may be coupled to a network 420 so as to allow CPU 411 to exchange communication and control signals with machine 100. In one embodiment, when an operator applies an input command to operator interface 304, CPU 411 may transmit the input command in the form of a control signal to controller 106 of machine 100 via network 420. Accordingly, when controller 106 receives the control signal, controller 106 may direct machine 100 to position and/or orient itself as a function of the control signal. Moreover, while machine 100 is being controlled by an operator at remote control console 300, controller 106 of machine 100 may generate and transmit communication signals to network 420 via wireless communication device 102. The communication signals may include the location coordinates that machine 100 receives from a plurality of Global Positioning Satellites via GPS antenna 104, the physical characteristics of machine 100, and pressures or positions associated with hydraulic actuators that are used to control machine 100, and machine 100 components such as, for example, an implement coupled to machine 100. Network 420 may then forward the communication signals to computing system 400, so that computing system 400 may determine the actual and future locations of machine 100, and display the visual image 306 and the virtual image 308 of machine 100 on display device 302 corresponding to the actual and future locations of machine 100, respectively.

Again, the predicted or estimated position of machine 100, and, therefore, the location of the virtual image 308 on display device 302, may be determined by computing system 400 using, for example, the time delay associated with controlling machine 100 remotely, and the physical characteristics of machine 100. Moreover, as stated above, the actual location of machine 100, and, therefore, the location of the visual image 308 on display device 302, may be determined by computing system 400 using, for example, location coordinates received from machine 100. The actual location of machine 100 components may be determined by computing system 400 using, for example, pressures or positions associated with hydraulic actuators that are used to control machine 100 components. Network 420 may include, for example, the Internet, a local area network, a workstation peer-to-peer network, a direct link network, a wireless network, or any other suitable wired and/or wireless communication platform.

INDUSTRIAL APPLICABILITY

The disclosed system and method may allow an operator controlling a machine remotely to visualize the entire machine and its operations on a display device. This may assist an operator in knowing, for example, where to place the implement of a machine when excavating overburden. Additionally, the disclosed system and method may take into consideration the time delay associated with such remote control. In this way, an operator using a display device to control the machine remotely from a far distance may overcome the difficulty of the actual movements of the machine being out of phase with what the operator observes the machine doing on the display device.

Figure 5:
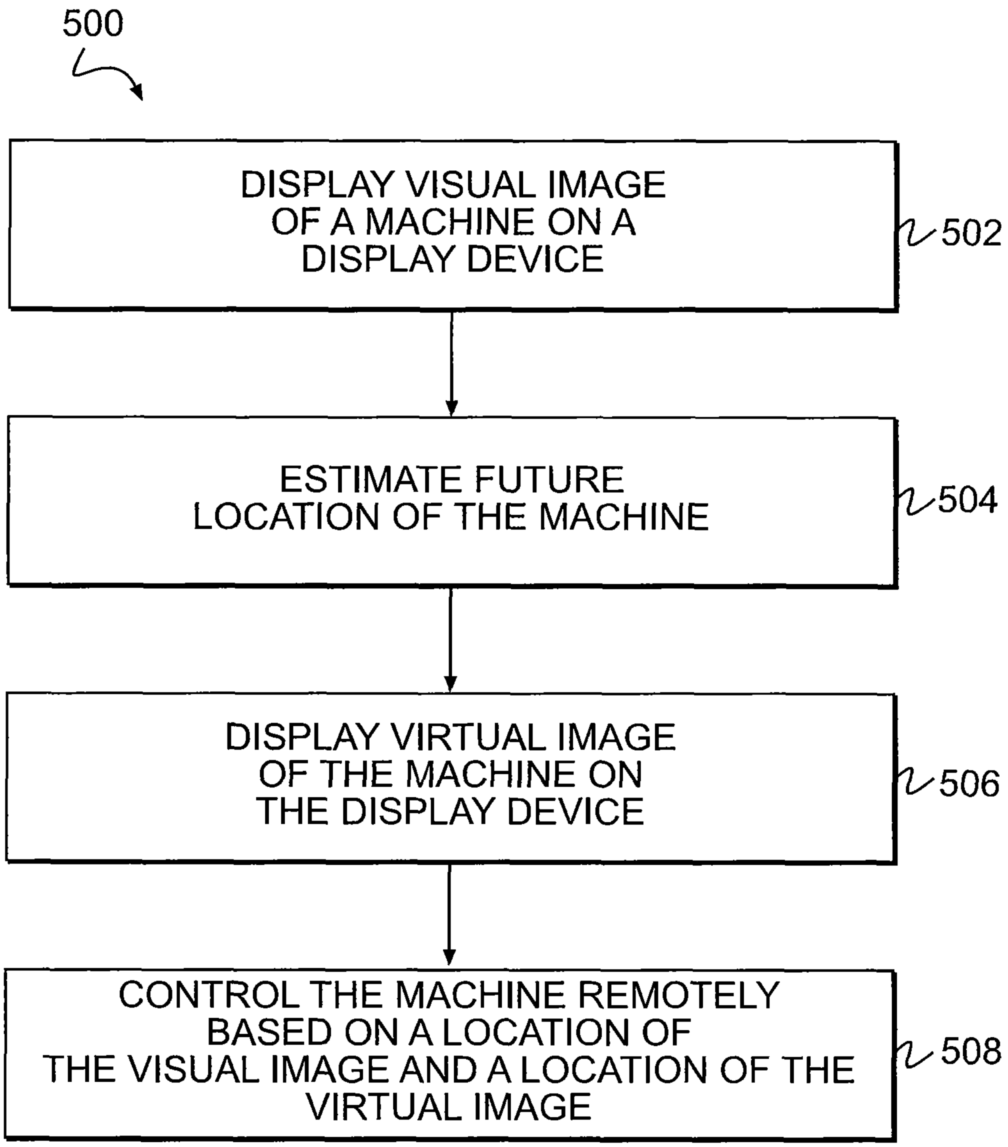
FIG. 5 is an exemplary method for controlling the machine of FIG. 1 remotely.

FIG. 5 illustrates a flowchart 500 depicting a method of using remote control console 300 at worksite 200 to control machine 100 remotely. The method in flowchart 500 may include displaying a visual image 306 of machine 100 on display device 302 (Step 502). The visual image 306 may correspond to the actual location of machine 100. For example, controller 106 may receive location coordinates corresponding to the present location of machine 100 from a plurality of Global Positioning Satellites via GPS antenna 104. Controller 106 may forward the location coordinates, the physical characteristics of machine 100, and pressures or positions associated with actuators that are used to control machine 100 to computing system 400. CPU 411 may process and use the received information to display the visual image 306 of machine 100 on display device 302 as described previously.

The method in flowchart 500 may further include estimating a future location of machine 100, while taking into consideration the time delay associated with controlling machine 100 remotely, and the physical characteristics of machine 100 (Step 504). For example, when an operator applies an input command to operator interface 304, CPU 411 may determine a future location of machine 100 corresponding to how machine 100 would react if the input command at operator interface 304 was received at machine 100 relatively instantaneously. CPU 411 may then display the future location of machine 100 on display device 302 in the form of the virtual image 308 (Step 506).

The method in flowchart 500 may further include an operator controlling machine 100 based on the location of the visual image 306 and the location of the virtual image 308 that is displayed on display device 302 (Step 508). For example, when an operator applies an input command to operator interface 304, CPU 411 may determine and display the visual image 306 and the virtual image 308 on display device 302 as described previously. Since the virtual image 308 corresponds to a future location of machine 100, the virtual image 308 may be out and in front of the visual image 306. The distance between the visual image 306 and the virtual image 308 on display device 302 may be a function of the time delay associated with the remote control system, and the physical characteristics of machine 100. Consequently, when the input command at operator interface 304 is stopped, the movement of the virtual image 308 being displayed on display device 302 may stop, and the visual image 306 being displayed on display device 302 may catch up and merge with the virtual image 308 being displayed on display device 302.

Although the steps in flowchart 500 are described in relation to a particular worksite and a particular machine, it is contemplated that the steps in flowchart 500 may be applicable to any working environment and any type and number of machines. It is further contemplated that the steps in flowchart 500 may be implemented in any suitable manner such as, for example, continuously, periodically, individually repeated, etc.

It is contemplated that certain methods consistent with the disclosed embodiments include additional and/or different steps than those described and shown in flowchart 500 of FIG. 5 without departing from the scope of the disclosure. For instance, as explained above, remote control console 300, and/or computing system 400 associated therewith, may be configured to receive, at a first time period, information indicative of machine position and/or location. For example, remote control console 300 may be configured to receive information indicative of a coordinate location, an orientation, and at least one operating parameter associated with a machine operating in a worksite.

Once position and/or location information associated with the machine has been received, remote control console may be configured to generate, on a display device associated with a remote control console, a first image associated with a position of the machine at a first time period. The first image is indicative of an actual location and position of the machine within the worksite at the first time period.

In addition to displaying the image associated with the actual location of the machine, the remote control console may be configured to estimate or predict a virtual position of the machine. For example, the remote control console (and/or computing system 400 associated therewith) may be equipped with software that is programmed to model or anticipate the behavior or performance of the machine based on the actual position information received from the machine and one or more operating parameters of the machine received during a past time interval. The predicted location or position of the machine may be displayed on the display module of the remote control console relative to the last known actual position of the machine, so that the operator of the remote control console can differentiate between the actual position of the machine and the simulated (i.e., modeled) position of the machine. This capability provides the operator at the remote control console with the ability to control the machine in the event that actual position and operational information provided by the machine is delayed or not otherwise provided to the remote control console.

According to one exemplary embodiment, the modeling software associated with the remote control console is configured to estimate a position of the machine based on a coordinate location of the machine received at the first (past) time period, an amount of time elapsed relative to the first time period, and at least one operating parameter associated with the machine at the first time period. The at least one operating parameter the at least one operating parameter may include any parameter that may be used to predict a future location of the machine such as, for example, a velocity of the machine, an acceleration of the machine, an angular position of the machine, and/or a pitch and roll of the machine. It is contemplated that the operating parameters listed above are exemplary only and not intended to be limiting. Indeed, additional and/or different parameters than those listed above may be used by the modeling software of remote control console to determine a future location of the machine.

The remote control console may be configured to update the first image (associated with actual location information received from the machine) whenever the information is received from the machine controller 106. For instance, remote control console may be configured to receive information indicative of a second position of the machine at a second time period, and update the first image based on the information indicative of the second position of the machine. When the information is received by the remote control console, the virtual image (i.e., the image associated with the modeled/predicted position or location of the machine) is automatically updated to conform to the information received from the machine. Thus, the software model used to generate the virtual image displayed on the remote control console is configured to update the virtual image based on the most recent information received that is indicative of the actual operation data of the machine.

In addition to displaying a virtual image indicative of the estimated machine position relative to the image that is indicative of the most recent actual position of the machine, the remote control console may also be configured to facilitate remote control of the machine. Accordingly, the remote control console may be configured to receive a command for controlling an operational aspect of the machine and transmit the received command to the machine. Additionally, the remote control console may update the virtual image of the machine based on at least one of the first image and the operator command. Accordingly, until the remote control console receives updated information associated with the actual location and position of the machine, an operator at the remote control console can still observe the effect of the machine command on the machine, by way of the virtual image. Once the remote control console receives updated information from the machine, both the first image and the virtual image may be updated based on the actual information received from the machine.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims.

What is claimed is:

1. A method for controlling a machine remotely, the method comprising:

generating, on a display device associated with a remote control console, a first image of the machine in a first position at a first time period;

estimating a virtual position of the machine based at least on the first position and at least one operating parameter associated with the machine, wherein the at least one operating parameter includes a pitch and roll of the machine; and generating, on the display device, a virtual image of the machine superimposed on the first image, the virtual image of the machine corresponding to the estimated virtual position of the machine.

2. The method of claim 1, further including:

receiving information indicative of a second position of the machine at a second time period; and updating the first image based on the information indicative of the second position of the machine.

3. The method of claim 1, further including:

receiving, at the remote control console associated with the display device, a command for controlling an operational aspect of the machine;

updating the virtual image of the machine based on at least one of the first image and the received command.

4. The method of claim 1, wherein the first image is indicative of an actual location of the machine and the virtual image is indicative of an estimated location of the machine, wherein the estimated location of the machine is determined by predicting behavior of the machine based on a software model adapted to predict machine performance based on the at least one operating parameter associated with the machine.

5. The method of claim 1, wherein generating the first image associated with the first position of the machine at the first time period includes:

receiving, at the first time period, information indicative of a coordinate location of the machine and an orientation of the machine;

determining a location of the machine within a worksite based on the received coordinate location of the machine and map information associated with the worksite; and generating the first image associated with the position of the machine based on the determined location of the machine within the worksite.

6. The method of claim 5, wherein generating the virtual image superimposed on the first image of the machine includes:

receiving the at least one operating parameter associated with the machine;

predicting the virtual position of the machine within the worksite based on the coordinate location of the machine received at the first time period, an amount of time elapsed relative to the first time period, and the at least one operating parameter associated with the machine; and generating the virtual image of the machine superimposed on the first image based on the predicted virtual position of the machine.

7. The method of claim 1, wherein the at least one operating parameter further includes at least one of a velocity of the machine, an acceleration of the machine, and an angular position of the machine.

8. A method for controlling a machine remotely, the method comprising:

receiving, at a first time period, information indicative of a coordinate location of the machine, an orientation of the machine, and at least one operating parameter associated with the machine, wherein the at least one operating parameter includes a pitch and roll of the machine;

generating, on a display device associated with a remote control console, a first image associated with a position of the machine within a worksite at a first time period;

predicting a virtual position of the machine within the worksite based on the coordinate location of the machine received at the first time period, a time delay associated with controlling the machine remotely, and the at least one operating parameter associated with the machine; and generating on the display device, a virtual image of the machine relative to the first image, the virtual image of the machine based on the predicted virtual position of the machine.

9. The method of claim 8, further including:

receiving, at the remote control console associated with the display device, a command for controlling an operational aspect of the machine; and updating the virtual image of the machine based on at least one of an updated first image and the received command.

10. The method of claim 8, further including:

receiving information indicative of a second position of the machine at a second time period; and updating the first image based on the information indicative of the second position of the machine.

11. The method of claim 8, wherein the first image is indicative of an actual location of the machine and the virtual image is indicative of an estimated location of the machine, wherein the estimated location of the machine is determined by predicting behavior of the machine based on a software model adapted to predict machine performance based at least on the actual location of the machine and the at least one operating parameter associated with the machine.

12. The method of claim 8, wherein generating the first image associated with the position of the machine at the first time period includes:

determining a location of the machine within a worksite based on the received coordinate location of the machine and map information associated with the worksite; and generating the first image associated with the position of the machine based on the determined location of the machine within the worksite.

13. The method of claim 8, wherein the at least one operating parameter further includes at least one of a velocity of the machine, an acceleration of the machine, and an angular position of the machine.

14. A remote control console configured to control a machine remotely, the remote control console comprising:

an operator interface configured to receive an input from an operator corresponding to a desired location of the machine; and a processor, configured to:

generate, on a display device associated with a remote control console, a first image of the machine in a first position at a first time period;

estimate a virtual position of the machine based at least on the first position and at least one operating parameter associated with the machine, wherein the at least one operating parameter includes a pitch and roll of the machine; and generate, on the display device, a virtual image of the machine superimposed on the first image, the virtual image of the machine corresponding to the estimated virtual position of the machine.

15. The remote control console of claim 14, wherein the processor is further configured to:

receive information indicative of a second position of the machine at a second time period; and update the first image based on the information indicative of the second position of the machine.

16. The remote control console of claim 14, wherein the processor is further configured to:

receive, at the remote control console associated with the display device, a command for controlling an operational aspect of the machine; and update the virtual image of the machine based on at least one of the first image and the received command.

17. The remote control console of claim 14, wherein the first image is indicative of an actual location of the machine and the virtual image is indicative of an estimated location of the machine, wherein the estimated location of the machine is determined by predicting behavior of the machine based on a software model adapted to predict machine performance based at least on the first position of the machine and the at least one operating parameter associated with the machine.

18. The remote control console of claim 14, wherein generating the first image associated with the first position of the machine at the first time period includes:

receiving, at the first time period, information indicative of a coordinate location of the machine and an orientation of the machine;

determining a location of the machine within a worksite based on the received coordinate location of the machine and map information associated with the worksite; and generating the first image associated with the position of the machine based on the determined location of the machine within the worksite.

19. The remote control console of claim 18, wherein generating the virtual image superimposed on the first image of the machine includes:

receiving the at least one operating parameter associated with the machine;

predicting the virtual position of the machine within the worksite based on the coordinate location of the machine received at the first time period, an amount of time elapsed relative to the first time period, and the at least one operating parameter associated with the machine; and generating the virtual image of the machine superimposed on the first image based on the predicted virtual position of the machine.

20. The remote control console of claim 14, wherein the at least one operating parameter further includes at least one of a velocity of the machine, an acceleration of the machine, and an angular position of the machine.

* * * * *